United States Patent
Yee et al.

(10) Patent No.: US 11,868,835 B2
(45) Date of Patent: Jan. 9, 2024

(54) MULTI-PART TRANSACTION CARD

(71) Applicant: Capital One Services, LLC, McLean, VA (US)

(72) Inventors: Bryant Yee, Silver Spring, MD (US); Ashley Dakota Ross, Silver Spring, MD (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/715,383

(22) Filed: Apr. 7, 2022

(65) Prior Publication Data

US 2023/0325625 A1    Oct. 12, 2023

(51) Int. Cl.
*G06K 19/077* (2006.01)

(52) U.S. Cl.
CPC .................. *G06K 19/0772* (2013.01)

(58) Field of Classification Search
CPC ......... G06K 19/0772; G06K 19/07728; G06K 19/063; G06K 5/02; G06K 19/041; G06K 13/063; G06Q 20/34; H01F 7/02; H01F 13/003; H01F 7/021; H01F 7/0284; H01F 7/0252; H01F 1/01; H01F 7/0242; H01F 7/0247; H01F 2038/127; H01F 7/0263; H01F 41/082; H01F 13/00; H01F 7/0273; H01F 7/04; H01F 10/14; H01F 10/26; H01F 7/0215; H01F 7/0226; H01F 7/0231;
(Continued)

(56) References Cited

U.S. PATENT DOCUMENTS

| 5,818,030 | A  |   | 10/1998 | Reyes |
|-----------|----|----|---------|-------|
| 6,554,193 | B1 | *  | 4/2003  | Fehrman ............. G06K 19/077 235/487 |
| 2018/0025261 | A1 |   | 1/2018 | Mosteller |

(Continued)

FOREIGN PATENT DOCUMENTS

| EP |       460606 A | * | 12/1991 | ........... G06K 13/063 |
| KR | 2013-0002775 U | * | 5/2013 |  |
| WO | WO-2012142902 A1 | * | 10/2012 | ........... G06K 19/041 |

OTHER PUBLICATIONS

Ebrahimi et al., "Static-, Dynamic-, and Mixed-Eccentricity Fault Diagnoses in Permanent-Magnet Synchronous Motors" (Year: 2009).*

*Primary Examiner* — Thien T Mai
(74) *Attorney, Agent, or Firm* — KDW Firm PLLC

(57) ABSTRACT

Provided are approaches for customizing transaction cards using a multi-part card body. In some approaches, the transaction card may include a first section comprising a first outer perimeter, a first interior edge, and a second interior edge extending from the first interior edge, wherein the first and second interior edges form an obtuse angle, and wherein a slot is formed in the first interior edge. The transaction card may further include a second section couplable with the first section, wherein the second section comprises a second outer perimeter, a third interior edge, and a fourth interior edge extending from the third interior edge, wherein a protrusion extends from the third interior edge, and wherein the protrusion is retained within the slot when the first section and the second section are joined together. The transaction card may further include a chip coupled to the first section.

20 Claims, 7 Drawing Sheets

(58) Field of Classification Search
CPC ...... H01F 7/0257; H01F 7/122; H01F 7/1615; H01F 7/20; H01F 7/206
See application file for complete search history.

(56) References Cited

U.S. PATENT DOCUMENTS

2018/0276647 A1    9/2018   Geupel
2019/0311344 A1   10/2019   Locke et al.

* cited by examiner

400

401

Providing a Transaction Card Having a First Section Including a First Outer Perimeter, a First Interior Edge, and a Second Interior Edge Extending from the First Interior Edge, wherein the First and Second Interior Edges Form an Obtuse Angle, and wherein a Slot is Formed in the first Interior Edge

402

Coupling a Second Section to the First Section by Inserting a Protrusion of the Second Section within the Slot of the first Section, Wherein the second Section Comprises a Second Outer Perimeter, a third Interior Edge, and a fourth Interior Edge Extending from the third Interior Edge, and wherein the Protrusion extends from the third interior Edge

FIG. 4

MULTI-PART TRANSACTION CARD

FIELD

Embodiments of the present disclosure relate to transaction cards and, more particularly, to multi-part transaction cards.

BACKGROUND

Transaction cards, such as credit cards and debit cards, typically contain account information such as the account number, owner's name, expiration date, etc. This information may be provided in different formats, and at different positions along the card. Transaction cards may also include one or more aesthetic features, which may be selected to increase brand or product recognition, and/or user appeal. Typically, the design cannot be customized or personalized once the card is constructed, however.

It is with respect to this and other considerations that the present improvements are provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a first section having a first outer perimeter, a first interior edge, and a second interior edge extending from the first interior edge, wherein the first and second interior edges form an obtuse angle, and wherein a slot is formed in the first interior edge. The transaction card may further include a second section couplable with the first section, wherein the second section comprises a second outer perimeter, a third interior edge, and a fourth interior edge extending from the third interior edge, wherein a protrusion extends from the third interior edge, and wherein the protrusion is retained within the slot when the first section and the second section are joined together. The transaction card may further include a chip coupled to the first section.

In another approach according to the disclosure, a transaction card may include a body having a first main side opposite a second main side, a first end opposite a second end, and a first side opposite a second side. The transaction card may further include a chip coupled to the first main side. The body of the transaction card may further include a first section comprising a first outer perimeter, a first interior edge, and a second interior edge extending from the first interior edge, wherein the first and second interior edges are oriented at an obtuse angle relative to one another, and wherein a slot is formed in the first interior edge. The body of the transaction card may further include a second section couplable with the first section, wherein the second section comprises a second outer perimeter, a third interior edge, and a fourth interior edge extending from the third interior edge, wherein a protrusion extends from the third interior edge, and wherein the protrusion is retained within the slot when the first section and the second section are joined together.

In yet another approach according to the disclosure, a transaction card may include a body having a first main side opposite a second main side, a first end opposite a second end, and a first side opposite a second side, wherein a chip is coupled to the first main side. The body may include a first section comprising a first outer perimeter, a first interior edge, and a second interior edge extending from the first interior edge, wherein the first and second interior edges are oriented at an obtuse angle relative to one another, and wherein a slot is formed in the first interior edge. The body may further include a second section couplable with the first section, wherein the second section comprises a second outer perimeter, a third interior edge, and a fourth interior edge extending from the third interior edge, wherein a protrusion extending from the third interior edge is slidable within the slot, and wherein a second protrusion extending from the fourth interior edge is insertable within a second slot of the first section.

BRIEF DESCRIPTION OF THE DRAWINGS

The accompanying drawings illustrate example approaches of the disclosure, including the practical application of the principles thereof, as follows:

FIG. 4 illustrates a flowchart for performing methods in accordance with embodiments of the present disclosure.

Figure 1A:
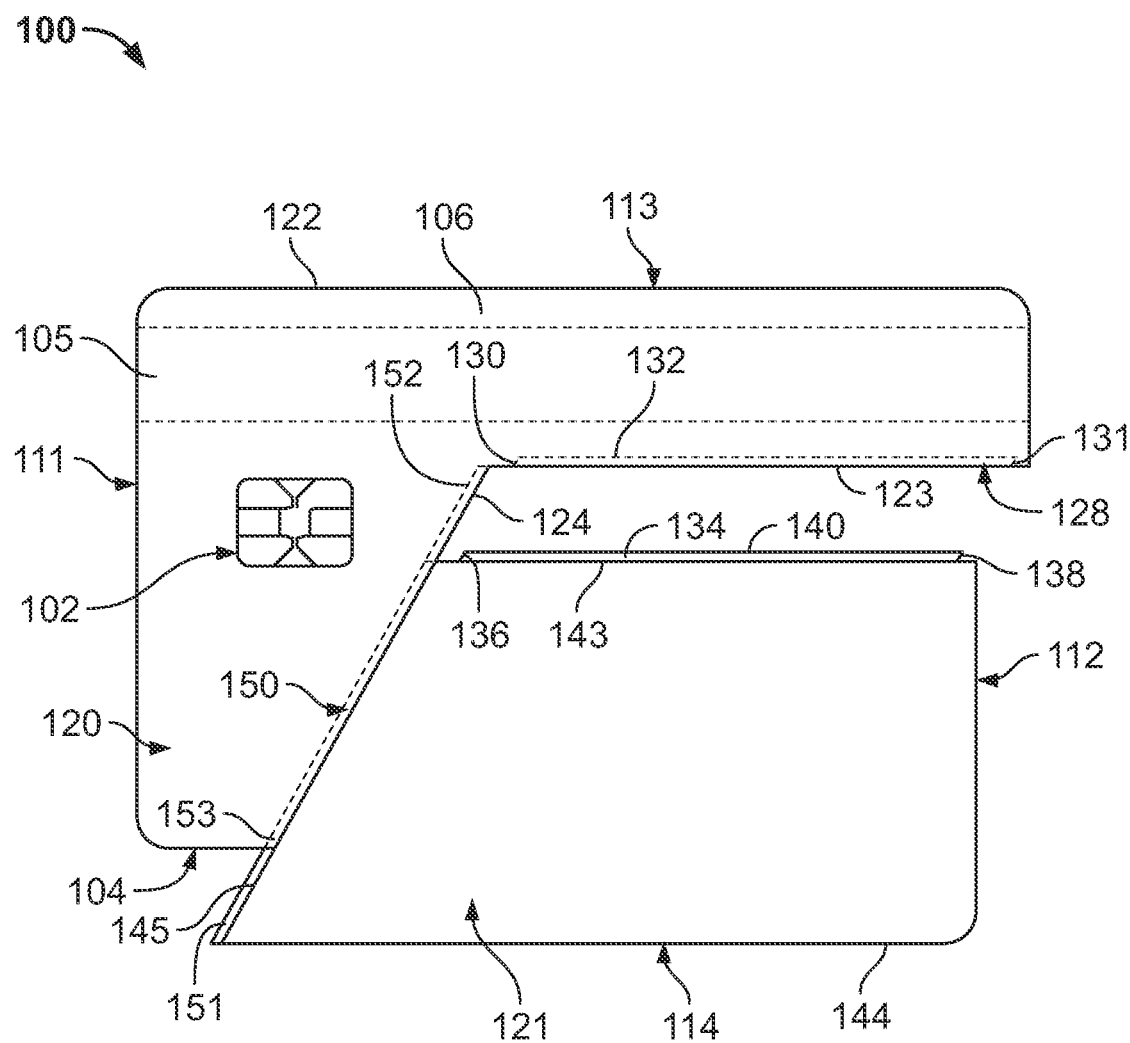
FIG. 1A is a top view illustrating a transaction card, in accordance with embodiments of the present disclosure.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to multi-part transaction cards including an identification (ID) chip, such as an EMV chip. In some embodiments, a body of the transaction card may include a first section having a first outer perimeter, a first interior edge, and a second interior edge extending from the first interior edge, wherein the first and second interior edges are oriented at an obtuse angle relative to one another, and wherein a slot is formed in the first interior edge. The body of the transaction card may further include a second section couplable with the first section, wherein the second section includes a second outer perimeter, a third interior edge, and a fourth interior edge extending from the third interior edge, wherein a protrusion extends from the third interior edge, and wherein the protrusion is retained within the slot when the first section and the second section are joined together. In some embodiments, the slot and the protrusion are held together by magnetic attraction.

Figure 1B:
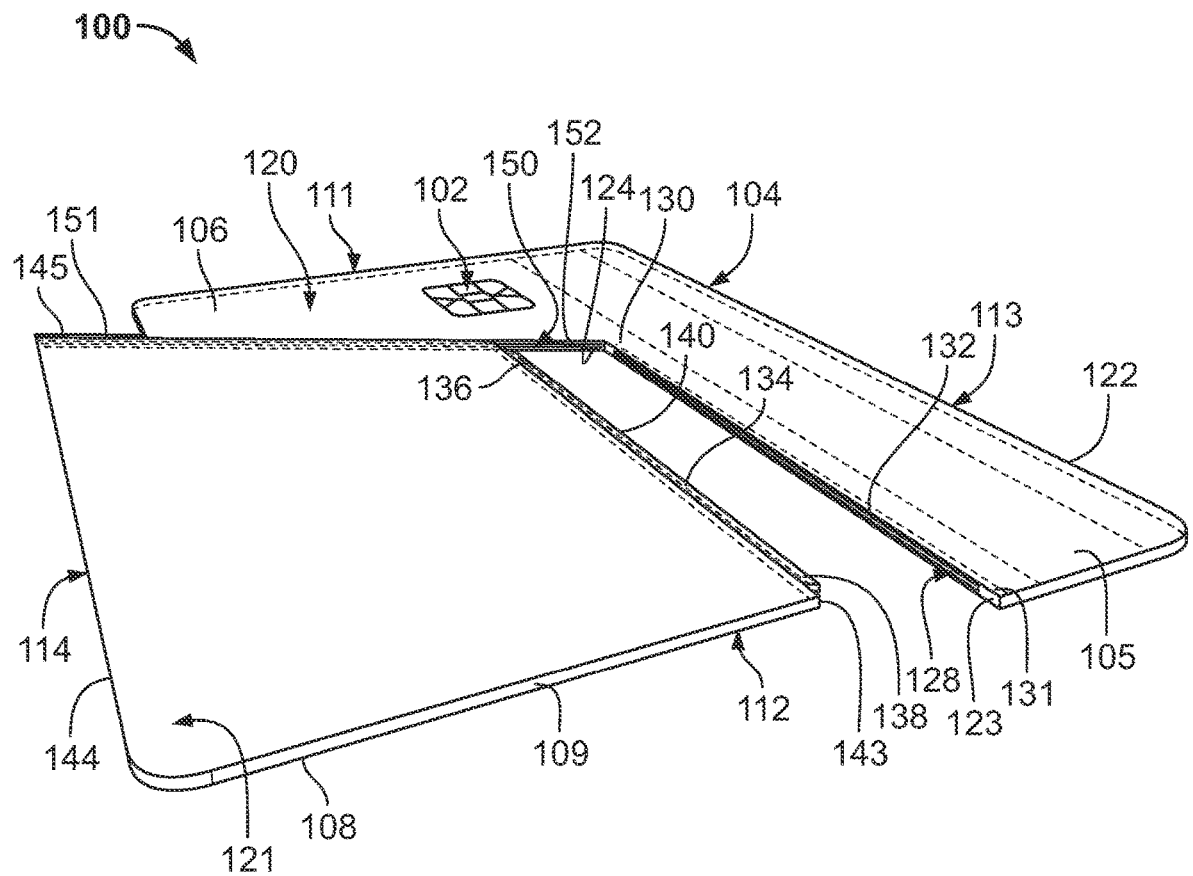
FIG. 1B is a perspective view illustrating the transaction card, in accordance with embodiments of the present disclosure.

Referring now to FIGS. 1A-1C, an example transaction card (hereinafter "card") 100 according to embodiments of the disclosure will be described. The card 100 may be a credit or debit card, a RFID passport, or an access card. As will be described in greater detail herein, the card 100 may include multiple layers each having one or more functions. Although non-limiting, the card 100 may be made from polyvinyl chloride (PVC), polyester, polycarbonate, or metal (e.g., a pure metal or metal alloy). Described sometimes herein as contactless due to the method of communication by an identification chip 102 (hereinafter "chip"), such as an EMV chip or RFID chip, the card 100 may also provide one or more functions requiring contact.

The card 100 may include a body 104 having a first main side 106 opposite a second main side 108. Although non-limiting, the first main side 106 may correspond to a front or top side of the card 100, while the second main side 108 may correspond to a back or bottom side of the card 100. The first main side 106 and the second main side are joined by a side surface 109 extending around a perimeter of the body 104. The body 104 may further include a first end 111 opposite a second end 112, and a first side 113 opposite a second side 114.

As used herein, the chip 102 may be any microprocessor device configured to exchange data electromagnetically. RFID chips may include a radio frequency inductor, volatile or non-volatile memory storage, a microprocessor, circuitry logic, and/or an antenna. While in some embodiments electromagnetic data communications from RFID chips will take place at radio frequencies, other embodiments may exchange electromagnetic data at different frequencies. Although non-limiting, the chip 102 may be recessed into the first main side 106 of the body 104.

As further shown, the body 104 of the card 100 may include a first section 120 couplable with a second section 121, wherein the first section 120 includes a first outer perimeter 122, a first interior edge 123, and a second interior edge 124 extending from the first interior edge 123. The chip 102 may part of the first section 120. In other embodiments, the chip 102 may be part of the second section 121. In yet other embodiments, the chip 102 may be part of the first section 120, while a second chip (not shown) may be part of the second section 121. As shown, the first and second interior edges 123, 124 of the first section 120 may form an obtuse angle. Said another way, a line or plane defining the first interior edge 123 and a line or plane defining the second interior edge 124 may form an angle greater than ninety (90) degrees but less than one hundred eighty (180) degrees. In some embodiments, the angle between the first interior edge 123 and the second interior edge 124 may be between 90-150 degrees.

The second section 121 may include a second outer perimeter 144, a third interior edge 143, and a fourth interior edge 145 extending from the third interior edge 143. In some embodiments, the third and fourth interior edges 143, 145 may form a second angle. That is, a line or plane defining the third interior edge 143 and a line or plane defining the fourth interior edge 145 may form a reflex angle, which may be added to the obtuse angle of the first and second interior edges 123, 124 to make a full 360-degree circle. In some embodiments, the second angle between the third and fourth interior edges 143, 145 may be between 210-270 degrees.

As shown, a protrusion 134 may extend from the third interior edge 143, wherein the protrusion 134 is retained within a first slot 128 of the first interior edge 123 when the first and second sections 120, 121 are joined together. In some embodiments, the first slot 128 may be formed between the first main side 106 and the second main side 108 and may include a first end 130, a second end 131, and an interior wall 132. The protrusion 134 may be a tab, flange, or tenon including a first end 136 opposite a second end 138. Although non-limiting, the first slot 128 and the protrusion 134 may have complimentary shapes/dimensions. For example, the first end 136 of the protrusion 134 may abut or engage the first end 130 of the first slot 128, the second end 138 of the protrusion 134 may abut or engage the second end 131 of the first slot 128, and a free edge 140 of the protrusion 134 may abut or engage the interior wall 132 of the first slot 128. In some embodiments, sidewall surfaces defining each of the first and second ends 130, 131 of the slot 128 may be angled to receive respective angled surfaces of the first and second ends 136, 138 of the protrusion 134. Although non-limiting, the sidewall surfaces of the slot 128 and the sidewall surfaces of the protrusion may extend parallel, or substantially parallel, to the plane defined by the second interior edge 124 of the first section 120. Engagement between the second end 131 of the slot 128 and the second end 138 of the protrusion 134 helps retain the first and second sections 120, 121 together.

In some embodiments, the card 100 may further include a second slot 150 formed in the second interior edge 124 of the first section 120, and a second protrusion 151 extending from the fourth interior edge 145 of the second section 121. The second slot 150 may include a first end 152 opposite a second end 153, wherein the second protrusion 151 is slid from the second end 153 towards the first end 152 when the first and second sections 120, 121 are brought together. In some embodiments, the second slot 150 and the second protrusion 151 may form a dovetail joint, which permits movement of the second section 121 only along a single line or plane. For example, the dovetail joint permits movement of the second section 121 between the first and second ends 152, 153 of the second slot 150, but prevents the second section 121 from moving away laterally from the second interior edge 124 when the first and second sections 120, 121 are coupled.

In some embodiments, the first and second sections 120, 121 may be held together by magnetic attraction. More specifically, the protrusion 134 and the first slot 128 may include a ferromagnetic material which, when positioned proximate one another, increases retention therebetween. In one embodiment, the protrusion 134 and the first slot 128 may include one or more magnets provided along complementing surfaces. Alternatively, or additionally, the second protrusion 151 and the second slot 150 may include a ferromagnetic material, such as one or more magnets, which further increase retention along the interface between the second interior edge 124 of the first section 120 and the fourth interior edge 145 of the second section 121.

In some embodiments, the first and second sections 120, 121 may be the same material. In other embodiments, the first and second sections 120, 121 may be different materials. For example, the first section 120 may be made from PVC while the second section 121 may be made from metal, fabric, natural or synthetic hair, wood, polyester, polycarbonate, or a combination of materials. Furthermore, the first and second sections 120, 121 may be made from a same material but have different visual features (e.g., colors, designs, logos, etc.).

In some embodiments, the card 100 may further include one or more magnetic stripes 105 provided along the first or second main sides 106, 108 of the body 104. In the embodiment shown, the magnetic stripe 105 may be a part of an exterior layer along the second main side 108. As further shown, the magnetic stripe 105 may be part of the first section 120. In other embodiments, the magnetic stripe 105 may be part of the second section 121. In yet other embodiments, the magnetic stripe 105 may extend across, and be part of, both the first and second sections 120, 121. As known, the magnetic stripe 105 may contain cardholder data in accordance with standard protocols.

Figure 2A:
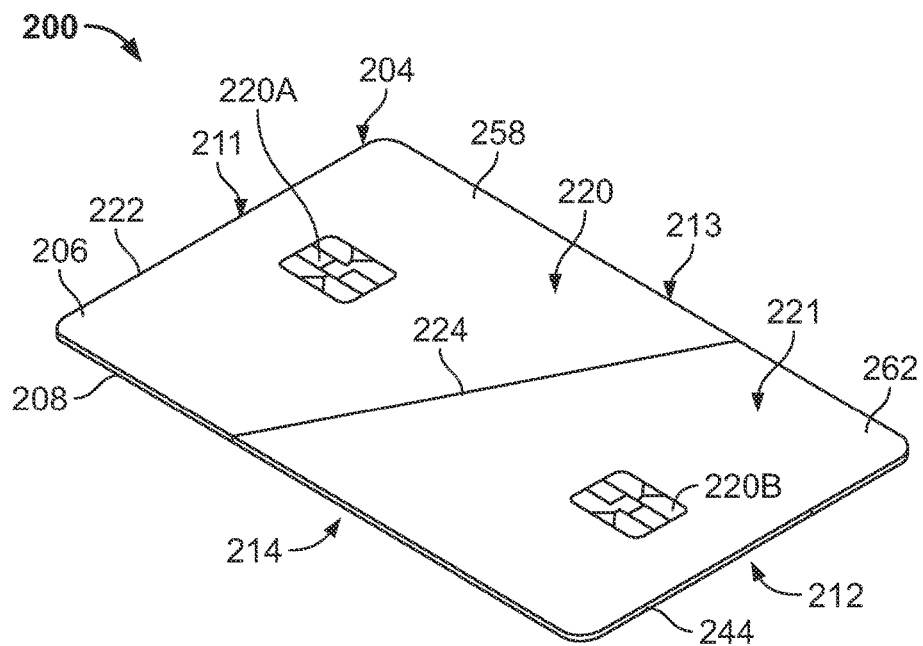
FIGS. 2A-2C are perspective views illustrating another transaction card, in accordance with embodiments of the present disclosure.
Figure 2B:
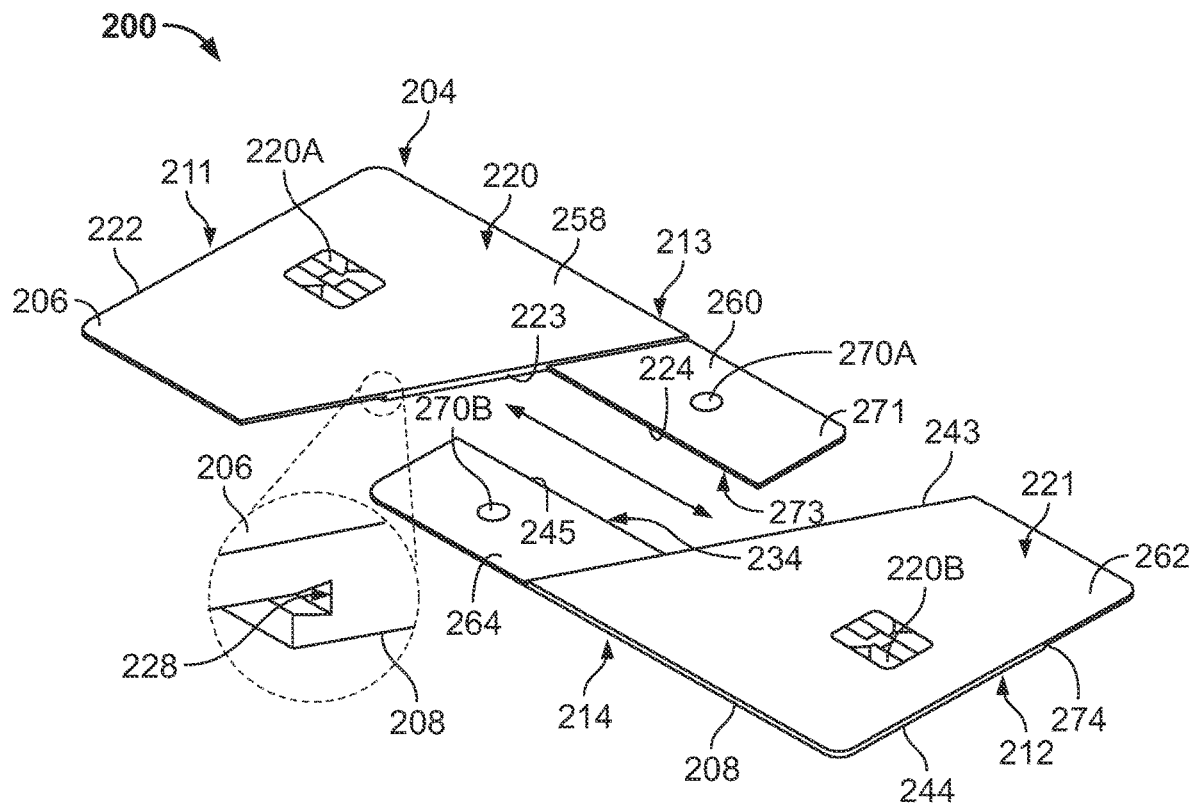

FIGS. 2A-2B depict another example transaction card (hereinafter "card") 200 according to embodiments of the disclosure. The card 200 may share many of the same components and features of the card 100 described above. As a such, only certain features of the card 200 will hereinafter be described for the sake of brevity. The card 200 may include a body 204 having a first main side 206 opposite a second main side 208, wherein the first main side 206 may correspond to a front or top side of the card 200 and the second main side 208 may correspond to a back or bottom side of the card 200. The body 204 may further include a first end 211 opposite a second end 212, and a first side 213 opposite a second side 214.

As further shown, the body 204 of the card 200 may include a first section 220 couplable with a second section 221. In some embodiments, the first section 220 includes a first main body 258 and a first arm 260 extending from the first main body 258, and the second section 221 includes a second main body 262 and a second arm 264 extending from the second main body 262. As shown, the first main body 258 overlaps with the second arm 264 and the second main body 262 overlaps the first arm 260 when the first and second sections 220, 221 are joined together. In some embodiments, the first arm 260 may extend to the second end 212 of the body 204 and the second arm 264 may extend to the first end 211 of the body 204. Furthermore, the first arm 260 may form part of the first side 213, while the second arm 264 may form part of the second side 214.

In some embodiments, the first arm 260 may include a third protrusion 270A extending from an upper surface 271 thereof. The third protrusion 270A is operable to engage a recess or divot (not shown) extending into an underside of the second main body 262 of the second section 221. Similarly, the second arm 264 may include a third protrusion 270B operable to engage a recess or divot extending into an underside of the first main body 258 of the first section 220. The third protrusions 270A, 270B and corresponding divots help retain the first and second sections 220, 221 together.

The first section 220 further includes a first outer perimeter 222, a first interior edge 223, and a second interior edge 224 extending from the first interior edge 223. As shown, the first and second interior edges 223, 224 of the first section 220 may form an obtuse angle. Said another way, a line or plane defining the first interior edge 223 and a line or plane defining the second interior edge 224 may form an angle greater than ninety (90) degrees but less than one hundred eighty (180) degrees. In some embodiments, the angle between the first interior edge 223 and the second interior edge 224 is between 90-150 degrees. The second section 221 may similarly include a second outer perimeter 244, a third interior edge 243, and a fourth interior edge 245 extending from the third interior edge 243. In some embodiments, the third and fourth interior edges 243, 245 may form a second obtuse angle. Although non-limiting, the first and second sections 220, 221 may be substantial duplicates of one another.

In some embodiments, a protrusion 234 may extend from the third interior edge 245, wherein the protrusion 234 is retained within a first slot 228 of the first interior edge 223 when the first and second sections 220, 221 are joined together. As shown, the first slot 228 may be formed between the first main side 206 and the second main side 208. In some embodiments, the first slot 228 may extend parallel to the first and second sides 213, 214 of the body 204. As shown, the first slot 228 may be a dovetail-shaped opening operable to receive the protrusion 234 of the second arm 264 when the first and second sections 220, 221 are brought together.

Similarly, a second protrusion 273 may extend from the second interior edge 224, wherein the second protrusion 273 is retained within a second slot 274 extending from the third interior edge 243 when the first and second sections 220, 221 are joined together. In some embodiments, the second slot 274 may be formed between the first main side 206 and the second main side 208 of the body 204. As shown, the second slot 274 may extend parallel to the first and second sides 213, 214 of the body 204. Similar to the first slot 228, the second slot 274 may be a dovetail-shaped opening operable to receive the second protrusion 273 of the first arm 260 when the first and second sections 220, 221 are brought together.

In some embodiments, the first and second sections 220, 221 may be held together by magnetic attraction. For example, the protrusion 234 and the first slot 228 may include ferromagnetic materials which, when positioned proximate one another, increase retention therebetween. In one embodiment, the protrusion 234 and the first slot 228 may include one or more magnets formed along complementing surfaces. Alternatively, or additionally, the second protrusion 273 and the second slot 274 may include ferromagnetic materials, such as one or more magnets, which further increase retention at the interface between the first arm 260 and the second main body 262. In still other embodiments, the first and second arms 260, 264 and/or third protrusions 270A, 270B may include a ferromagnetic material.

The card 200 may further include one or more chips 202A, 202B formed along the first or second main sides 206, 208 of the body 204. As shown, chip 202A may be formed along the first main side 206 of the first section 220, while chip 202B may be formed along the first main side 206 of the second section 221. As such, the card 200 may connect a user with multiple accounts.

In some embodiments, the first and second sections 220, 221 may be the same material. In other embodiments, the first and second sections 220, 221 may be different materials. For example, the first section 220 may be made from PVC while the second section 221 may be made from metal, fabric, natural or synthetic hair, wood, polyester, polycarbonate, or a combination of materials. Furthermore, the first and second sections 220, 221 may be made from a same material but have different visual features (e.g., colors, designs, logos, etc.).

Figure 2C:
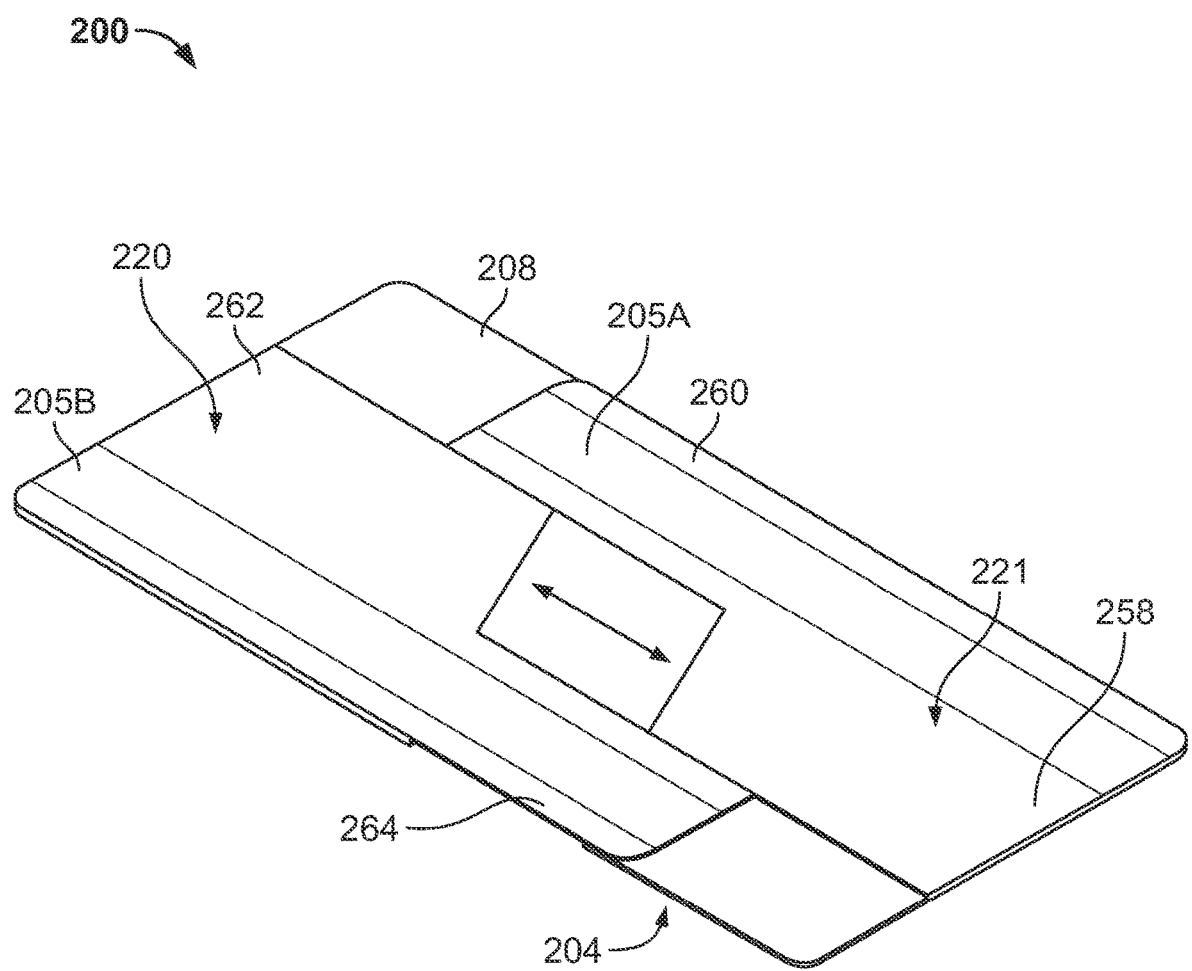

As shown in FIG. 2C, in some embodiments, the card 200 may further include one or more magnetic stripes 205A, 205B provided on the second main side 208 of the body 204. In some embodiments, the magnetic stripes 205A, 205B are part of an exterior layer along the second main side 208 of the body 204. As shown, the magnetic stripe 205A may be part of the first section 220, extending across the first main body 258 and the first arm 260. Similarly, the magnetic stripe 205B may be part of the second section 221, extending across the second main body 262 and the second arm 264. As known, the magnetic stripes 205A, 205B may contain cardholder data in accordance with standard protocols. In some embodiments, the first section 220 may have symmetrical or identical dimensions to those of the second section 221. Accordingly, either the first section 220 or the second section 221 may interconnect with a further section (not shown) also having symmetrical or identical dimensions to those of the first and second sections 220, 221.

Figure 3A:
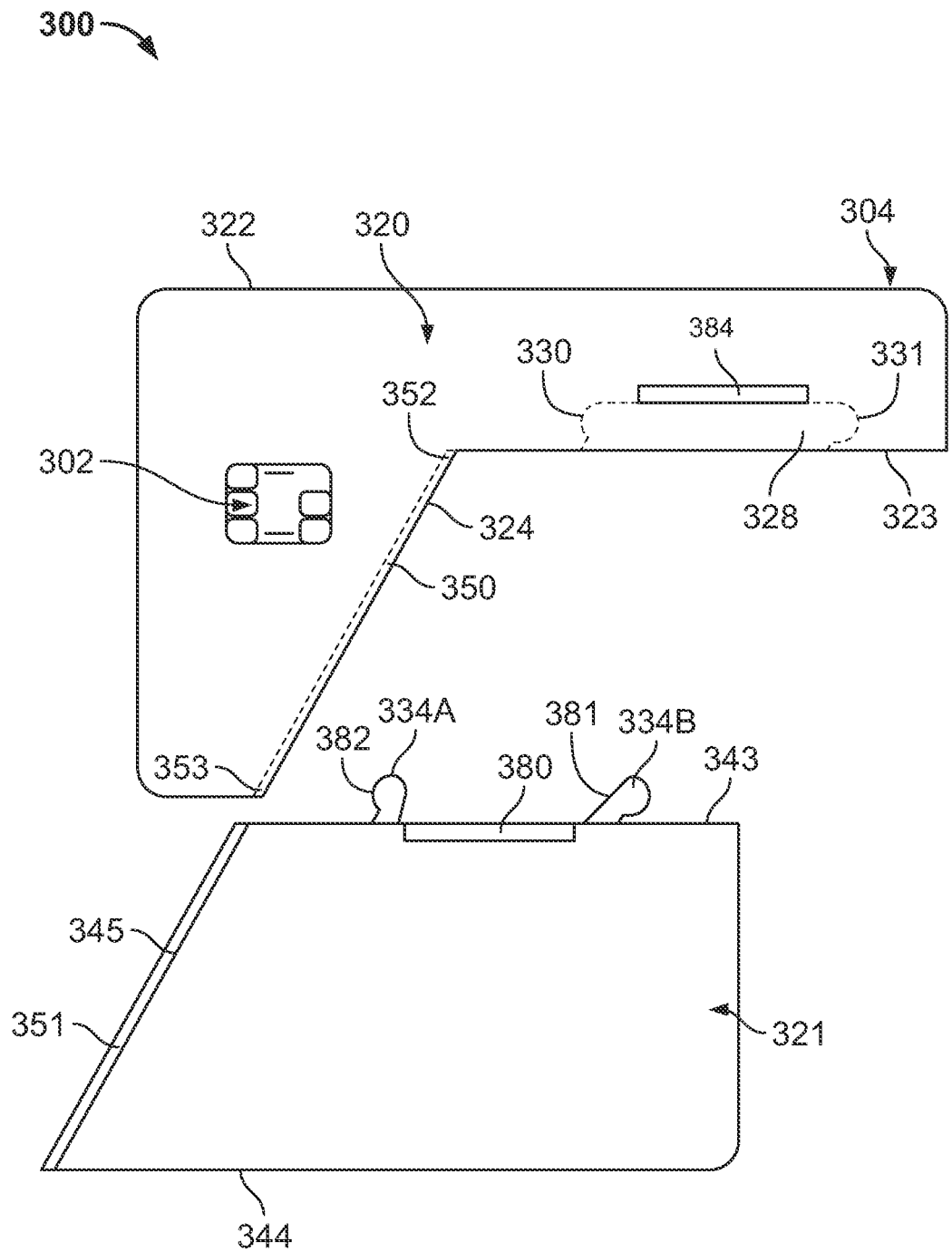
FIGS. 3A-3B are top views illustrating another transaction card, in accordance with embodiments of the present disclosure.
Figure 3B:
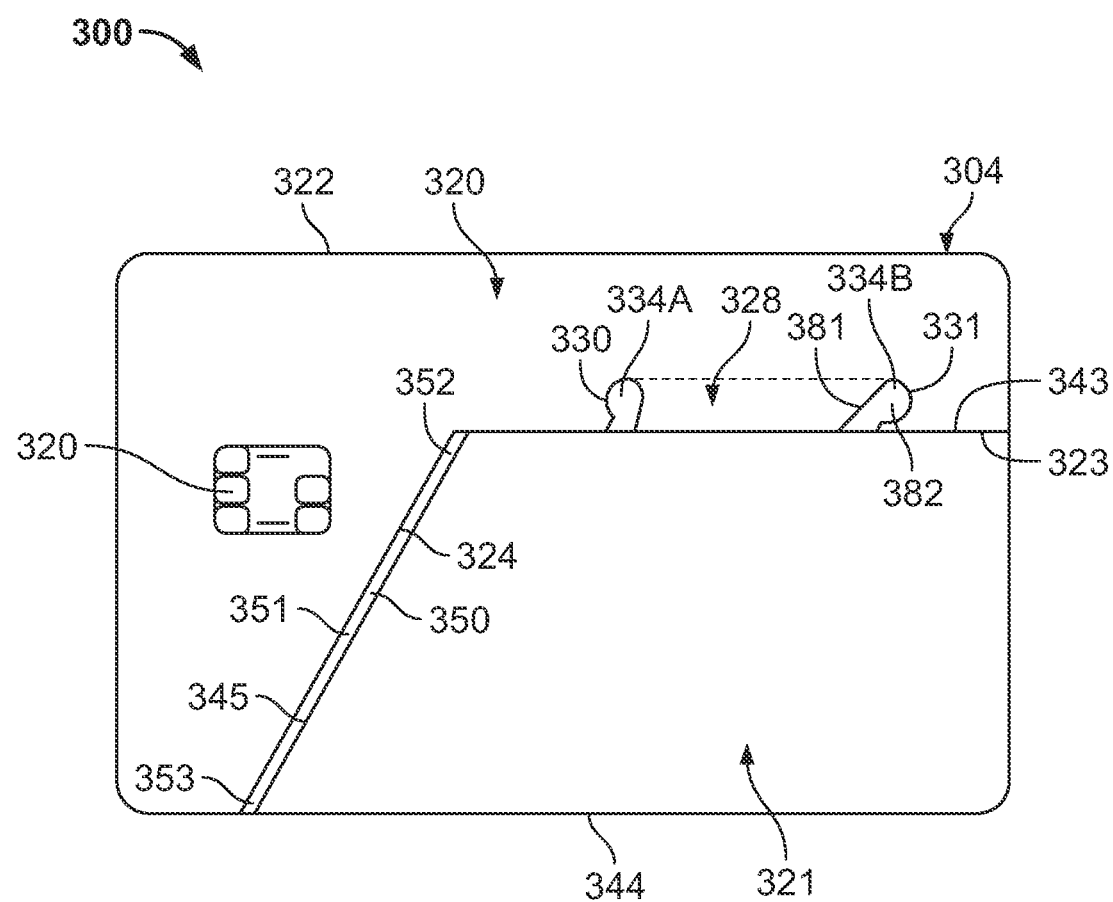

FIGS. 3A-3B depict another example transaction card (hereinafter "card") 300 according to embodiments of the disclosure. The card 300 may share many of the same components and features of the cards 100 and 200 described above. As a such, only certain features of the card 300 will hereinafter be described for the sake of brevity. As shown, a body 304 of the card 300 may include a first section 320 couplable with a second section 321, wherein the first section 320 includes a first outer perimeter 322, a first interior edge 323, and a second interior edge 324 extending from the first interior edge 323. In some embodiments, the first and second interior edges 323, 324 of the first section 320 may form an obtuse angle. Said another way, a line or plane defining the first interior edge 323 and a line or plane defining the second interior edge 324 may form an angle greater than ninety (90) degrees but less than one hundred eighty (180) degrees. In some embodiments, the angle between the first interior edge 323 and the second interior edge 324 is between 90-150 degrees.

The second section 321 may include a second outer perimeter 344, a third interior edge 343, and a fourth interior edge 345 extending from the third interior edge 343. In some embodiments, the third and fourth interior edges 343, 345 may form a second angle. A line or plane defining the third interior edge 343 and a line or plane defining the fourth interior edge 345 may form a reflex angle, which may be added to the obtuse angle of the first and second interior edges 323, 324 to make a full 360-degree circle. In some embodiments, the second angle between the third and fourth interior edges 343, 345 is between 210-270 degrees.

A chip 302 may be part of the first section 320. In other embodiments, the chip 302 may be part of the second section 321. In yet other embodiments, the chip 302 may be part of the first section 320, while a second chip (not shown) may be part of the second section 321.

As shown, a set of protrusions 334A, 334B may extend from the third interior edge 343, wherein the protrusions 334A, 334B are operable to be retained within a first slot 328 of the first interior edge 323 of the first section 320. The protrusions 334A, 334B may be flexible tabs, buckles, or claps positioned on opposite sides of a first magnet 380. Each of the protrusions 334A, 334B may include a flat inner surface 381 and a curved or radiused outer surface 382. During insertion, the radiused outer surface 382 may act as a cam surface operable to engage the first interior edge 323 at an entrance of the first slot 328 and force the protrusions 334A, 334B towards one another as the first and second sections 320, 321 are joined together. Once the protrusions 334A, 334B move past the narrower entrance of the first slot 328, the protrusions 334A, 334B deflect away from one another and nest within the bump-outs or cavities at the first and second ends 330, 331 of the first slot 328, respectively. Although non-limiting, the first slot 328 and the protrusions 334A, 334B may have complimentary shapes/dimensions. Engagement between the first end 330 and protrusion 334A, and between second end 331 and protrusion 334B, helps retain the first and second sections 320, 321 together. Furthermore, in some embodiments, the first slot 328 may include a second magnet 384 operable to interact with the first magnet 380 along the third interior edge 343 to further retain the first and second sections 320, 321 together.

In some embodiments, the card 300 may further include a second slot 350 formed in the second interior edge 324 of the first section 320 and a second protrusion 351 extending from the fourth interior edge 345 of the second section 321. The second slot 350 may include a first end 352 opposite a second end 353, wherein the second protrusion 351 is slid from the second end 353 towards the first end 352 when the first and second sections 320, 321 are brought together. In some embodiments, the second slot 350 and the second protrusion 351 may form a dovetail joint, which permits movement of the second section 321 only along a single line or plane. For example, the dovetail joint permits movement of the second section 321 between the first and second ends 352, 353 of the second slot 350, but prevents the second section 321 from moving laterally away from the second interior edge 324 when the first and second sections 320, 321 are coupled.

In some embodiments, the first and second sections 320, 321 may be the same material. In other embodiments, the first and second sections 320, 321 may be different materials. For example, the first section 320 may be made from PVC while the second section 321 may be made from metal, fabric, natural or synthetic hair, wood, polyester, polycarbonate, or a combination of materials. Furthermore, the first and second sections 320, 321 may be made from a same material but have different visual features (e.g., colors, designs, logos, etc.).

Turning now to FIG. 4, a method 400 according to embodiments of the disclosure will be described in greater detail. At block 401, the method 400 may include providing a transaction card having a first section including a first outer perimeter, a first interior edge, and a second interior edge extending from the first interior edge, wherein the first and second interior edges form an obtuse angle, and wherein a slot is formed in the first interior edge. In some embodiments, an ID chip (EMV) is coupled to a first main side of the first section.

At block 402, the method may include coupling a second section to the first section by inserting a protrusion of the second section within the slot of the first section, wherein the second section comprises a second outer perimeter, a third interior edge, and a fourth interior edge extending from the third interior edge, and wherein the protrusion extends from the third interior edge. In some embodiments, the method may include retaining a second protrusion of the second section within a second slot of the first section when the first and second sections are joined together. In some embodiments, the first and second sections may be further held together by a plurality of magnets.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the cards 100, 200, and 300 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 400 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 400 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
   a first section comprising a first outer perimeter, a first interior edge, and a second interior edge extending from the first interior edge, wherein the first and second interior edges form an obtuse angle, and wherein a slot is formed in the first interior edge; and
   a second section couplable with the first section, wherein the second section comprises a second outer perimeter, a third interior edge, and a fourth interior edge extending from the third interior edge, wherein a protrusion extends from the third interior edge, and wherein the protrusion is retained within the slot when the first section and the second section are joined together, wherein the protrusion comprises a first magnet and the slot comprises a second magnet; and
   a chip coupled to the first section.

2. The transaction card of claim 1, further comprising a second protrusion extending from the fourth interior edge, wherein the second protrusion is retained with a second slot of the first section when the first and second sections are joined together.

3. The transaction card of claim 1, wherein the first and second magnets are positioned proximate one another to increase retention between the first and second sections when the first and second sections are joined.

4. The transaction card of claim 1, wherein the protrusion comprises a deflectable tab operable to nest within a cavity of the slot.

5. The transaction card of claim 1, further comprising a second chip coupled to the second section.

6. The transaction card of claim 1, wherein the first section comprises a first magnetic stripe, and wherein the second section comprises a second magnetic stripe.

7. The transaction card of claim 1, wherein the first section is a first material, and wherein the second section is a second material different than the first material.

8. The transaction card of claim 1, further comprising a third protrusion extending from the first section, and wherein the third protrusion is retained within a divot extending into the second section when the first and second sections are joined together.

9. The transaction card of claim 1, wherein the first section comprises a first main body and a first arm extending from the first main body, wherein the second section comprises a second main body and a second arm extending from the second main body, wherein the first main body overlaps with the second arm when the first and second sections are joined together, and wherein the second main body overlaps with the first arm when the first and second sections are joined together.

10. A transaction card, comprising:
a body comprising a first main side opposite a second main side, a first end opposite a second end, and a first side opposite a second side; and
a chip coupled to the first main side, wherein the body comprises:
a first section comprising a first outer perimeter, a first interior edge, and a second interior edge extending from the first interior edge, wherein the first and second interior edges are oriented at an obtuse angle relative to one another, and wherein a slot is formed in the first interior edge; and
a second section couplable with the first section, wherein the second section comprises a second outer perimeter, a third interior edge, and a fourth interior edge extending from the third interior edge, wherein a protrusion extends from the third interior edge, and wherein the protrusion is retained within the slot when the first section and the second section are joined together, wherein the protrusion comprises a first magnet and the slot comprises a second magnet.

11. The transaction card of claim 10, further comprising a second protrusion extending from the fourth interior edge, wherein the second protrusion is retained with a second slot of the first section when the first and second sections are joined together.

12. The transaction card of claim 10, wherein the first and second magnets are positioned proximate one another to increase retention between the first and second sections when the first and second sections are joined.

13. The transaction card of claim 10, wherein the protrusion comprises a deflectable tab operable to nest within a cavity of the slot.

14. The transaction card of claim 10, further comprising a second chip coupled to the second section.

15. The transaction card of claim 10, wherein the first section comprises a first magnetic stripe, and wherein the second section comprises a second magnetic stripe.

16. The transaction card of claim 10, further comprising a third protrusion extending from the first section, and wherein the third protrusion is retained within a divot extending into the second section when the first and second sections are joined together.

17. The transaction card of claim 10, wherein the first section comprises a first main body and a first arm extending from the first main body, wherein the second section comprises a second main body and a second arm extending from the second main body, wherein the first main body overlaps with the second arm when the first and second sections are joined together, and wherein the second main body overlaps with the first arm when the first and second sections are joined together.

18. A transaction card, comprising:
a body comprising a first main side opposite a second main side, a first end opposite a second end, and a first side opposite a second side; and
a chip coupled to the first main side, wherein the body comprises:
a first section comprising a first outer perimeter, a first interior edge, and a second interior edge extending from the first interior edge, wherein the first and second interior edges are oriented at an obtuse angle relative to one another, and wherein a slot is formed in the first interior edge; and
a second section couplable with the first section, wherein the second section comprises a second outer perimeter, a third interior edge, and a fourth interior edge extending from the third interior edge, wherein a protrusion extending from the third interior edge is slidable within the slot, and wherein a second protrusion extending from the fourth interior edge is insertable within a second slot of the first section, wherein the protrusion comprises a first magnet and the slot comprises a second magnet.

19. The transaction card of claim 18, wherein the first and second magnets are positioned proximate one another to increase retention between the first and second sections when the first and second sections are joined.

20. The transaction card of claim 18, wherein the first section comprises a first main body and a first arm extending from the first main body, wherein a magnetic stripe extends along the first arm, wherein the second section comprises a second main body and a second arm extending from the second main body, wherein the first main body overlaps with the second arm when the first and second sections are joined together, and wherein the second main body overlaps with the first arm when the first and second sections are joined together.

* * * * *